US005608548A

United States Patent [19]

Sobol

[11] Patent Number: 5,608,548
[45] Date of Patent: Mar. 4, 1997

[54] AUTOMATIC COLOR ADJUSTMENT IN A DOCUMENT PROCESSING ENVIRONMENT

[75] Inventor: Robert E. Sobol, Fort Collins, Colo.

[73] Assignee: Hewlett-Packard Company, Palo Alto, Calif.

[21] Appl. No.: 364,163

[22] Filed: Dec. 23, 1994

[51] Int. Cl.⁶ .................................................. G03F 3/00
[52] U.S. Cl. ................................. 358/522; 358/520
[58] Field of Search ......................... 358/522, 516, 358/505, 504, 518, 520; 382/167; 395/109, 131; 345/153, 155, 199; 348/717, 631, 679, 624, 603, 649

[56] References Cited

U.S. PATENT DOCUMENTS

| | | | |
|---|---|---|---|
| 3,983,575 | 9/1976 | Nagai et al. | 348/603 |
| 4,742,387 | 5/1988 | Oshima | 348/603 |
| 4,908,701 | 3/1990 | Udagawa | 358/520 |
| 4,984,071 | 1/1991 | Yonezawa | 358/522 |
| 5,341,464 | 8/1994 | Friedman et al. | 345/155 |
| 5,420,704 | 5/1995 | Winkelman | 358/522 |
| 5,426,582 | 6/1995 | Bossaert et al. | 358/522 |

Primary Examiner—Stephen Brinich

[57] ABSTRACT

A system and method for automatically adjusting image color in a document processing system are discussed. The system operates by generating a digital representation of a printed document. The digital representation includes a plurality of pixels. A brightness value is calculated for each of the pixels, and a "brightest" list is generated comprising a plurality of the pixels having the largest brightness values. Also, a "darkest" list comprising a plurality of the pixels having the smallest brightness values is generated. An average bright color of pixels in the "brightest" list is generated, and an average dark color of pixels in the "darkest" list is generated. Red, green, and blue scaling functions each having a white point set equal to the average bright color and a black point set equal to the average dark color are generated. The digital representation is scaled in accordance with the red, green, and blue scaling functions to produce a modified image.

19 Claims, 5 Drawing Sheets

AUTOMATIC COLOR ADJUSTMENT IN A DOCUMENT PROCESSING ENVIRONMENT

BACKGROUND OF THE INVENTION

1. Field of the Invention

The present invention relates generally to document processing systems, and more particularly to schemes for automatic color adjustment in document processing systems.

2. Related Art

A document processing system typically includes one or more image capture devices (ICDs) for obtaining digital representations (also called digital images, or simply images) of documents. The image capture devices include optical input devices, such as photocopiers and optical readers and scanners. The digital images are then processed by other components of the document processing system.

Conventionally, such processing includes an adjustment of the colors in the digital images. This color adjustment operation is needed to compensate for deficiencies in the original documents.

Consider, for example, a photograph. The color of white usually varies in a photograph. Also, typically, white areas in a photograph are not purely white, but include some tint. Consequently, what appears to be white in a photograph does not usually scan as pure white. Instead, the resulting digital image typically includes some tint. Removing this tint (i.e., correcting the "white point") operates to improve the appearance of the image. As is well known, "white point" refers to the color represented when the tristimulus values used to measure a color (such as red, green, and blue) are equal in value and are at their maximum values. Alternatively, if tristimulus values are measured according to the CIE metric $L^*$, $a^*$, and $b^*$, then the white point is represented by $L^*=100$, $a^*=0$, and $b^*=0$.

Similarly, the color of black in a photograph varies widely with exposure and development. Thus, what appears to be black in a photograph often does not scan as pure black. Correcting this (i.e., correcting the "black point") operates to improve the depth of the image. As is well known, "black point" refers to the color represented when the tristimulus values used to measure a color (such as red, green, and blue) are equal in value and are at their minimum values. Alternatively, if tristimulus values are measured according to the CIE metric $L^*$, $a^*$, and $b^*$, then the black point is represented by $L^*=0$, $a^*=0$, and $b^*=0$.

The color adjustment operation discussed above is also needed to compensate for deficiencies in the image capture devices. The white point of a scanner may not match the color white as represented in a given photograph. With some scanners, for example, the white point may be set such that most "white" things scan with a yellowish pink tint.

Also, some scanners have difficulty reporting the absence of light as a neutral black. As a result, with some scanners, the darkest part of a scan is often bluish-purple. Other scanners suffer from different color faults.

Thus, in conventional document processing systems, color adjustment processing is often performed to compensate for color-related deficiencies in the original documents, and/or in image capture devices.

Conventionally, such color adjustment processing is performed manually. Clearly, this is not an optimal solution since manual color adjustment processing is tedious and time-consuming.

Attempts have been made to automate the color adjustment process. Such attempts have been either incomplete or not entirely effective, or both.

For example, one such attempt involved identifying the brightest pixel in the digital image, and measuring the color of this pixel. If the color of this pixel was sufficiently close to a neutral white, then this pixel (and all other pixels of the same color) was scanned as pure white.

This approach is not entirely effective because the color adjustment is based on a single pixel. Consequently, measurement noise sometimes reduces the accuracy of the color adjustment. Also, this approach is not complete since it does not include black point adjustment.

The deficiencies of prior devices is represented, for example, in a commercial product called "Adobe Photoshop," an image editor used with the Apple Macintosh computer and with computers running the Microsoft Windows operating system. "Adobe Photoshop" provides an "Auto" option which they advertise as performing automatic color adjustment. However, this "Auto" option must be manually invoked by the user. Also, this "Auto" option does not produce satisfactory results. "Adobe Photoshop" also appears to provide a user-selectable option for adjusting the white and/or black points based on a single pixel. The flaws with this approach are discussed above.

Accordingly, what is required is an improved system and method for automated color adjustment in a document processing environment.

SUMMARY OF THE INVENTION

Briefly stated, the present invention is directed to a system and method for automatically adjusting image color in a document processing system. According to the present invention, a digital representation of a printed document is generated. The digital representation includes a plurality of pixels. A brightness value is calculated for each of the pixels, and a "brightest" list is generated comprising a plurality of the pixels having the largest brightness values. Also, a "darkest" list comprising a plurality of the pixels having the smallest brightness values is generated.

Then, an average bright color of pixels in the "brightest" list is generated, and an average dark color of pixels in the "darkest" list is generated. Red, green, and blue scaling functions each having a white point set equal to the average bright color and a black point set equal to the average dark color are generated. Finally, the digital representation is scaled in accordance with the red, green, and blue scaling functions to produce a modified image.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
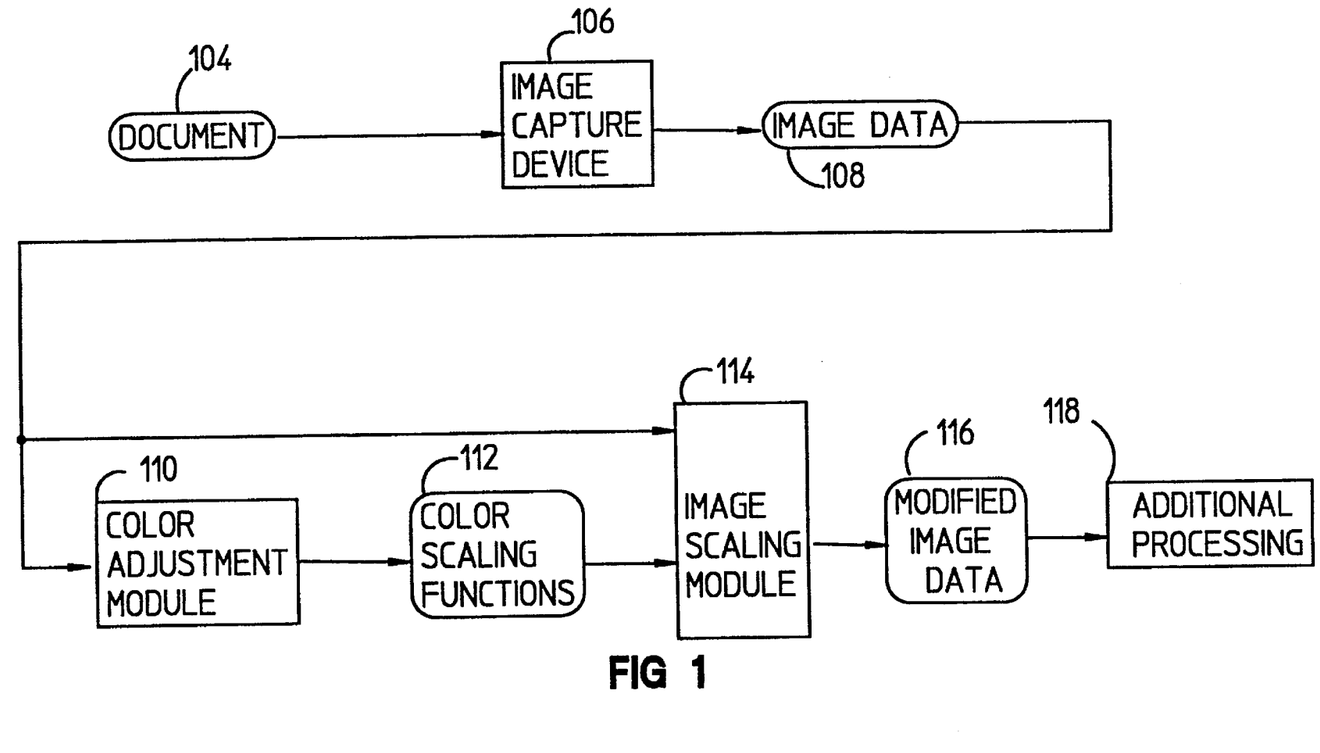
FIG. 1 is a block diagram of a document processing system according to a preferred embodiment of the present invention.

FIG. 1 is a block diagram of a document processing system 102 according to a preferred embodiment of the present invention. The document processing system 102 includes an image capture device 106, a color adjustment module 110, and an image scaling module 114. The document processing system 102 also includes memory (such as random access memory), not shown, for storing image data 108, color scaling functions 112, modified image data 116, etc.

The image capture device 106 represents any well known photocopier, optical reader, optical scanner, or other optical input device. A suitable form of the image capture device 106 is the Hewlett-Packard ScanJet IIcx, although other image capture devices could alternatively be used. The color adjustment module 110 and the image scaling module 114 preferably represent any well known computer operating in accordance with software (implementation of such software will be apparent to persons skilled in the relevant art based on the discussion contained herein), such that the operations discussed herein are performed in software. Alternatively, the color adjustment module 110 and the image scaling module 114 are implemented predominately in hardware (for example, the color adjustment module 110 and the image scaling module 114 represent hardware state machines).

Figure 2:
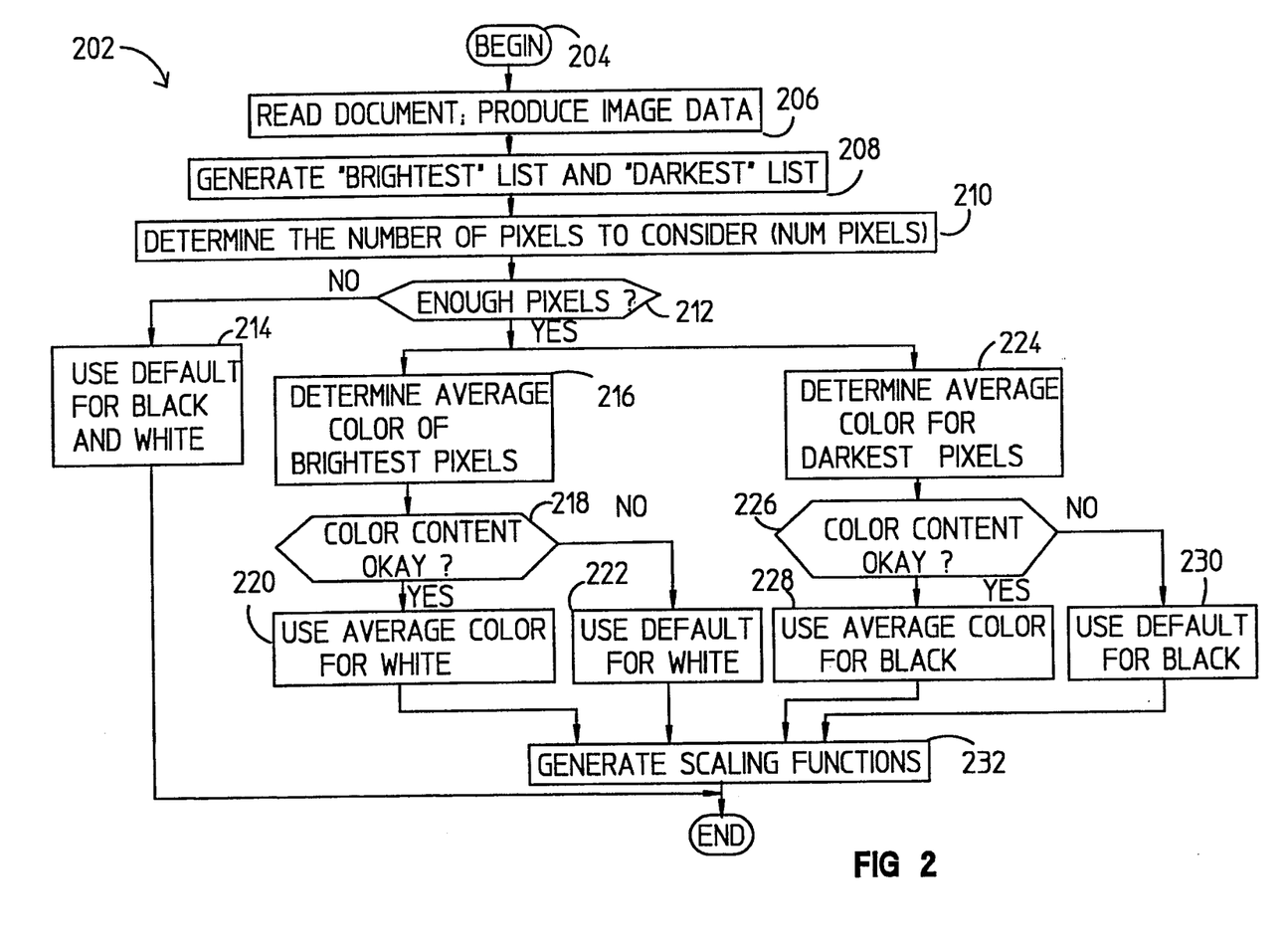
FIGS. 2 and 5 are flowcharts representing the operation of the document processing system according to a preferred embodiment of the present invention.

The operation of the document processing system 102 according to the present invention shall now be described with reference to a flowchart 202 shown in FIG. 2. Flowchart 202 begins with step 204, where control immediately passes to step 206.

In step 206, the image capture device 106, in a well known manner, reads (i.e., scans) a printed document 104 and produces a digital representation of the document 104. This digital representation of the document 104 is represented by image data 108. The document 104 is a printed object, such as a print, a photograph, a painting, a page from a periodical, a label, etc. Preferably, the document 104 is a color document, but the principles of the present invention as described herein are also applicable to the processing of black and white documents having any number of gray scales.

In producing the image data 108, the image capture device 106, in a well known manner, samples the document 104 X number of times such that the image data 108 includes X pixels. Preferably, X is a value in the range of 10,000 to 500,000, although other values of X are possible and envisioned (for example, a user may specify another value of X).

Each pixel in the image data 108 includes three values: a red value, a green value, and a blue value. The red, green, and blue values for any pixel are each in a range from a minimum pixel value to a maximum pixel value. Preferably, the minimum pixel value is equal to 0 and the maximum pixel value is equal to 255 (other ranges are possible and envisioned). Thus, each red value is within the range of 0 to 255. Similarly, each green and blue value is within the range of 0 to 255.

A pixel preferably represents "pure white" if its red, green, and blue values are all equal to the maximum pixel value (i.e., 255). A pixel preferably represents "pure black" if its red, green, and blue values are all equal to the minimum pixel value (i.e., 0).

The image data 108 produced by the image capture device 106 is provided to the color adjustment module 110. In step 208, the color adjustment module 110 calculates a brightness value for each pixel in the image data 108. Preferably, the brightness value is calculated on a per pixel basis according to Equation 1:

$$\text{Brightness Value} = \text{Red Value} + \text{Green Value} + \text{Blue Value}. \quad \text{Equation 1}$$

For example, if a pixel in the image data 108 has a red value of 110, a green value of 26, and a blue value of 177, then the brightness value for that pixel is 313. Other formulae could alternatively be used to arrive at a measure of brightness. One such alternative formula, for example, is the NTSC conversion from RGB color to gray:

$$\text{Gray} = 0.3 * \text{Red} + 0.59 * \text{Green} + 0.11 * \text{Blue}$$

Also in step 208, the color adjustment module 110 generates a first list (called the brightest list) of the fifty pixels (or, alternatively, some other number of pixels) in the image data 108 having the largest brightness values. These pixels represent the brightest pixels. Also, the color adjustment module 110 generates a second list (called the darkest list) of the fifty pixels (or, alternatively, some other number of pixels) in the image data 108 having the smallest brightness values. These pixels represent the darkest pixels.

According to the present invention, the color adjustment module 110 adjusts the white point and the black point of the image data 108 based on an analysis of a plurality of pixels in the image data 108. In steps 210 and 212, the color adjustment module 110 determines whether there are sufficient pixels in the image data 108 to perform automatic color adjustment (i.e., whether there are sufficient pixels in the image data 108 to accurately adjust the white and black points). If the image data 108 does not contain a sufficient number of pixels, then any adjustment made by the color adjustment module 110 might not be accurate. In such cases, the color adjustment module 110 does not adjust the color of the image data 108. It is noted that steps 210 and 212 could alternatively be performed after step 206 and before step 208.

More particularly, in step 210 the color adjustment module 110 determines the number of pixels to analyze while adjusting the white point, and the number of pixels to analyze while adjusting the black point. Preferably, the color adjustment module 110 considers the same number of pixels while adjusting the white and black points. The color adjustment module 110 performs step 210 according to Equation 2:

$$\text{NumPixels} = \text{TotalPopulation}/1000 \quad \text{Equation 2}$$

In Equation 2, NumPixels is the number of pixels which the color adjustment module 110 analyzes while adjusting the white and black points, and the TotalPopulation is the number of pixels in the image data 108. As is clear from Equation 2, the color adjustment module 110 preferably considers 0.1% of the total number of pixels in the image data 108, although other percentages can alternatively be used. Generally, the percentage of pixels considered should be greater for documents having greater areas of white space.

Optionally, for performance purposes, the color adjustment module 110 in step 210 determines whether NumPixels is greater than 50. If NumPixels is greater than 50, then NumPixels is set equal to 50 (in other words, NumPixels has an upper limit of 50). This limit on the value of NumPixels is imposed to ensure that documents are processed in an acceptable length of time.

In step 212, the color adjustment module 110 determines whether the image data 108 includes enough pixels to properly adjust the white and black points. This determination is based on the value of NumPixels. Specifically, if NumPixels is less than a predetermined value (which is preferably equal to five, although other values could alternatively be used), then the color adjustment module 110 concludes that the image data 108 does not include enough pixels to properly adjust the white and black points. In this case, the color adjustment module 110 performs step 214. In step 214, the color adjustment module 110 determines that the default values should be used for the white and black points. The default white point is equal to red=green=blue=255. The default black point is equal to red=green=blue=0. In this case, the color adjustment module 110 and the image scaling module 114 (described below) do not adjust the color of the image data 108. The operation of flowchart 202 is complete after the performance of step 214, as indicated by step 234.

If, instead, it is determined in step 212 that NumPixels is greater than or equal to the predetermined value, then the color adjustment module 110 concludes that the image data 108 includes enough pixels to properly adjust the white and black points. In this case, the color adjustment module 110 performs in parallel the sequence of steps beginning with steps 216 and 224.

Consider first the sequence of steps beginning with step 216. In step 216, the color adjustment module 110 determines the average bright color of the fifty brightest pixels (i.e., of the pixels in the brightest list). This average bright color has three components: an average brightest red value ($Red_{b,ave}$), an average brightest green value ($Green_{b,ave}$), and an average brightest blue value ($Blue_{b,ave}$). The average brightest red value is an average of the red values of all of the pixels in the brightest list. Similarly, the average brightest green value is an average of the green values of all of the pixels in the brightest list, and the average brightest blue value is an average of the blue values of all of the pixels in the brightest list. In other words, the average bright color is calculated as follows:

$$Red_{b,ave} = \frac{\sum_{i=0}^{NumPixels-1} R_{brightest}[i]}{NumPixels},$$

$$Green_{b,ave} = \frac{\sum_{i=0}^{NumPixels-1} G_{brightest}[i]}{NumPixels},$$

$$Blue_{b,ave} = \frac{\sum_{i=0}^{NumPixels-1} B_{brightest}[i]}{NumPixels}.$$

Equation 3

In step 218, the color adjustment module 110 determines whether the color content of the average bright color is consistent with the color white. As noted above, pure white is characterized by a red, green, blue value all equal to 255. In other words, pure white is characterized by red, green, blue having the same value. Thus, if the average brightest red value ($Red_{b,ave}$), the average brightest green value ($Green_{b,ave}$), and the average brightest blue value ($Blue_{b,ave}$) are not all equal to the same value, or at least close to the same value, then it is very likely that the original document 104 does not contain any white areas. If this is the case, then it would not be correct to adjust the white point.

The color adjustment module 110 performs step 218 by evaluating the following equation:

ColorContent = [max($Red_{b,ave}$, $Green_{b,ave}$, $Blue_{b,ave}$) − min($Red_{b,ave}$, $Green_{b,ave}$, $Blue_{b,ave}$)]

Equation 4

Then, the color adjustment module 110 in step 218 determines whether ColorContent is less than a predetermined bright color content value (which is preferably equal to 50, although other values could alternatively be used). If the ColorContent is less than this predetermined bright color content value, then the color adjustment module 110 determines that it should use the average bright color to modify the white point (step 220). Otherwise, the color adjustment module 110 determines that it should use the default white point, i.e., the color adjustment module 110 determines that the white point should not be adjusted (step 222).

For example, suppose that the average bright color has the following values: $Red_{b,ave}$=225, $Green_{b,ave}$=217, $Blue_{b,ave}$=240. In this case, the ColorContent is equal to 23 (240−217). The ColorContent is less than 50. Thus, the color adjustment module 110 determines that it should use the average bright color to modify the white point (step 220). Consider now the sequence of steps beginning with step 224. These steps are very similar to the steps beginning with step 216. Specifically, in step 224, the color adjustment module 110 determines the average dark color of the fifty darkest pixels (i.e., of the pixels in the darkest list). This average dark color has three components: an average darkest red value ($Red_{d,ave}$), an average darkest green value ($Green_{d,ave}$), and an average darkest blue value ($Blue_{d,ave}$). The average darkest red value is an average of the red values of all of the pixels in the darkest list. Similarly, the average darkest green value is an average of the green values of all of the pixels in the darkest list, and the average darkest blue value is an average of the blue values of all of the pixels in the darkest list. In other words, the average dark color is calculated as follows:

$$Red_{d,ave} = \frac{\sum_{i=0}^{NumPixels-1} R_{darkest}[i]}{NumPixels},$$

$$Green_{d,ave} = \frac{\sum_{i=0}^{NumPixels-1} G_{darkness}[i]}{NumPixels},$$

$$Blue_{d,ave} = \frac{\sum_{i=0}^{NumPixels-1} B_{darkness}[i]}{NumPixels}.$$

Equation 5

In step 226, the color adjustment module 110 determines whether the color content of the average dark color is consistent with the color black. As noted above, pure black is characterized by a red, green, blue value all equal to 0. In other words, pure black is characterized by red, green, blue having the same value. Thus, if the average darkest red value ($Red_{d,ave}$), the average darkest green value ($Green_{d,ave}$), and the average darkest blue value ($Blue_{d,ave}$) are not all equal to the same value, or at least close to the same value, then it is very likely that the original document 104 does not contain any black areas. If this is the case, then it would not be correct to adjust the black point.

The color adjustment module 110 performs step 226 by evaluating the following equation:

ColorContent = [max($Red_{d,ave}$, $Green_{d,ave}$, $Blue_{d,ave}$) − min($Red_{d,ave}$, $Green_{d,ave}$, $Blue_{d,ave}$)]

Equation 6

Then, the color adjustment module 110 in step 226 determines whether ColorContent is less than a predetermined dark color content value (which is preferably equal to 50, although other values could alternatively be used). If the ColorContent is less than this predetermined dark color content value, then the color adjustment module 110 determines that it should use the average dark color to modify the black point (step 228). Otherwise, the color adjustment module 110 determines that it should use the default black point, i.e., the color adjustment module 110 determines that the black point should not be adjusted (step 230).

Step 232 is performed after steps 220, 222, 228, and/or 230 are performed. In step 232, the color adjustment module 110 generates a red scaling function, a green scaling function, and a blue scaling function. In these scaling functions, the average bright color (if step 220 was performed) or the default white value (if step 222 was performed) is considered the white point, and the average dark color (if step 228 was performed) or the default black value (if step 230 was performed) is considered the black point. These scaling functions are used by the image scaling module 114 to adjust the color of the pixels in the image data 108 (described below). These scaling functions collectively represent the color scaling functions 112 shown in FIG. 1.

Figure 3:
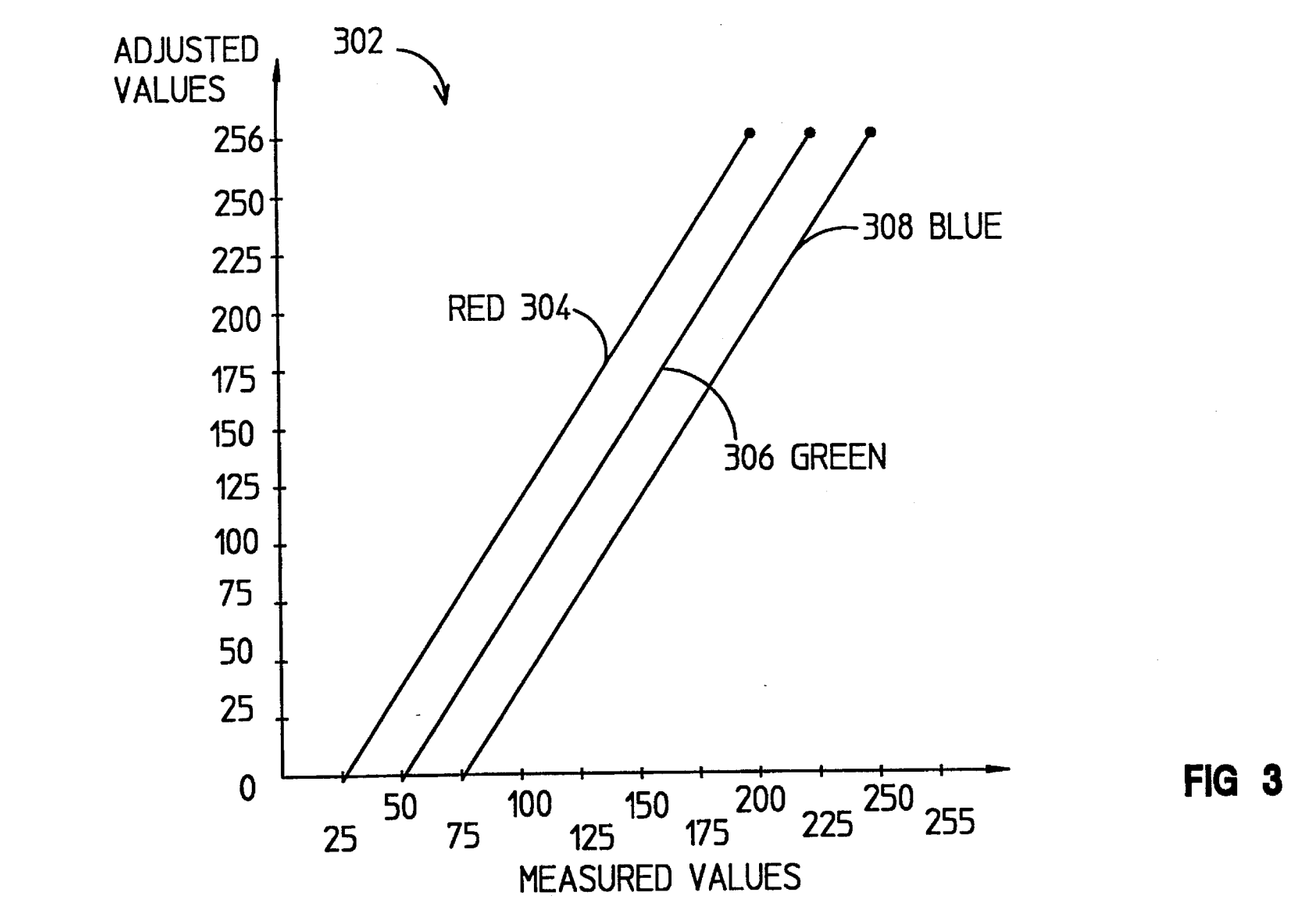
FIGS. 3 and 4 are example color scaling functions produced by the present invention.

FIG. 3 illustrates an example graph 302 comprising a red scaling function 304, a green scaling function 306, and a blue scaling function 308. The graph 302 has a horizontal axis (the x-axis) that corresponds to the measured pixel values (i.e., the red, green, and blue values measured in step 206). The graph 302 has a vertical axis (the y-axis) that corresponds to the adjusted color values.

FIG. 3 corresponds to an example scenario where the average bright color is: $Red_{b,ave}=200$, $Green_{b,ave}=225$, $Blue_{b,ave}=250$, and the average dark color is: $Red_{d,ave}=25$, $Green_{d,ave}=50$, $Blue_{d,ave}=75$. The red scaling function 304 is a linear relationship having one end point with the (x,y) coordinate of: ($Red_{d,ave}$,minimum pixel value), and another end point with the (x,y) coordinate of: ($Red_{b,ave}$,maximum pixel value), where the minimum pixel value is preferably equal to 0 and the maximum pixel value is preferably equal to 255. Similarly, the green scaling function 306 is a linear relationship having one end point with the (x,y) coordinate of: ($Green_{d,ave}$,minimum pixel value), and another end point with the (x,y) coordinate of: ($Green_{b,ave}$,maximum pixel value). The blue scaling function 308 is a linear relationship having one end point with the (x,y) coordinate of: ($Blue_{d,ave}$,minimum pixel value), and another end point with the (x,y) coordinate of: ($Blue_{b,ave}$,maximum pixel value).

Figure 4:
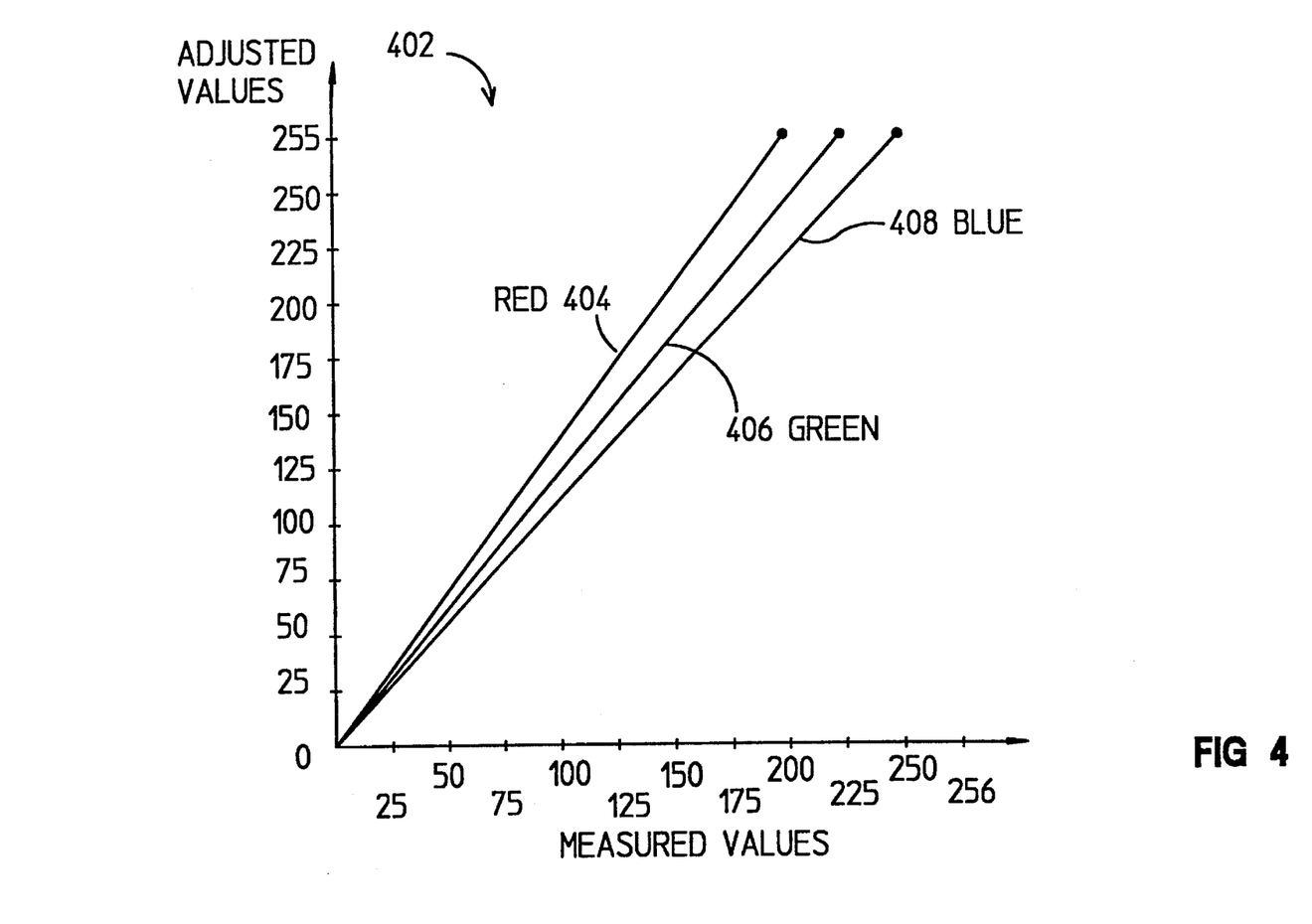

FIG. 4 illustrates another example graph 402 comprising a red scaling function 404, a green scaling function 406, and a blue scaling function 408. FIG. 4 corresponds to an example scenario where the average bright color is: $Red_{b,ave}=200$, $Green_{b,ave}=225$, $Blue_{b,ave}=250$, and where the default black point is being used (i.e., where step 230 was performed).

Although in the embodiment described above linear scaling functions in RGB were used, one may alternatively use other non-linear and/or non-RGB scaling functions. For example, one might generate the scaling functions in an alternative color space such as CIE L*a*b*, which has various desirable properties. For example, the L*a*b* color space has the property of being more perceptually linear than RGB.

The operation of flowchart 202 is complete after step 232 is performed, as indicated by step 234.

Referring again to FIG. 1, the image scaling module 114 receives both the image data 108 and the color scaling functions 112. The image scaling module 114 modifies the color of the image data 108 in accordance with the color scaling functions 112. The operation of the image scaling module 114 is represented by a flowchart 502 in FIG. 5. Flowchart 502 begins with step 504, where control immediately passes to step 506.

Figure 5:
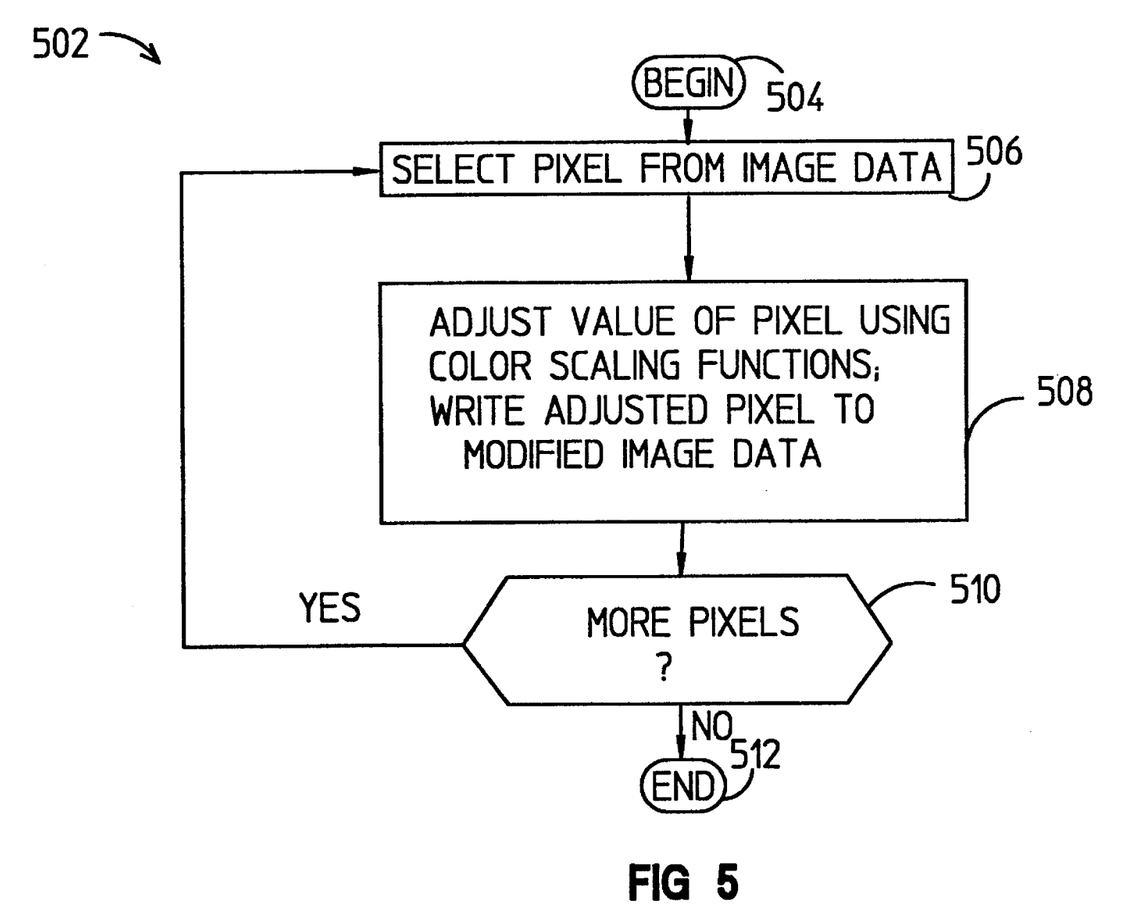

In step 506, the image scaling module 114 selects a pixel from the image data 108.

In step 508, the image scaling module 114 adjusts the color of the selected pixel in accordance with the color scaling functions 112. The image scaling module 114 adjusts the red value of the selected pixel by finding, for the relevant red scaling function, the value on the y-axis that corresponds to the value on the x-axis. The image scaling module 114 adjusts the green and blue values of the selected pixel in a similar manner. These adjusted red, green, and blue values are written to a modified data image 116 in place of the original red, green, and blue values. Suppose, for example, that the selected pixel has a red value of 200, a green value of 100, and a blue value of 75. Also assume that the scaling functions 304, 306, 308 shown in FIG. 3 are being used. In this case, the image scaling module 114 sets the red value equal to 256, the green value equal to approximately 75, and the blue value equal to 0.

The image scaling module 114 adjusts the color of each pixel in the image data 108, as indicated by step 510. After the color of all of the pixels in the image data 108 have been adjusted, then the operation of flowchart 502 is complete, as indicated by step 512. It is noted that, where it was determined that color adjustment would not be performed (steps 212 and 214 in FIG. 2), then the image scaling module 114 does not process the image data 108 as just described. In this case, the modified image data 116 is equal to the image data 108.

The modified image data 116 is further processed by other components of the document processing system 102. Such additional processing is indicated by reference number 118 in FIG. 1. Such additional processing does not form a part of the present invention, and thus shall not be discussed further.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of adjusting image color in a document processing system, comprising the steps of:

(1) generating a digital representation of a printed document, said digital representation comprising a plurality of pixels, each pixel having red, green, and blue values;

(2) calculating a brightness value consisting of a function of said red, green, and blue values for each of said pixels;

(3) generating a "brightest" list comprising a plurality of said pixels having the largest brightness values;

(4) calculating averages of red, green, and blue values of pixels in said "brightest" list to determine an average bright color of pixels in said "brightest" list;

(5) generating red, green, and blue scaling functions each having a white point set equal to said average bright color; and (6) scaling said digital representation in accordance with said red, green, and blue scaling functions to produce a modified image.

2. The method of claim 1 in which each of said red, green, and blue scaling functions have a black point, further comprising the steps of:

(7) generating a "darkest" list comprising a plurality of said pixels having the smallest brightness values; and (8) calculating an average dark color of pixels in said "darkest" list; wherein step (5) comprises the step of setting said black point to said average dark color.

3. The method of claim 2, wherein said "brightest" list and said "darkest" list each comprise fifty of said pixels.

4. The method of claim 2, further comprising the steps of:

determining whether said digital representation contains a sufficient number of pixels to accurately perform color adjustment;

if said digital representation does not contain a sufficient number of pixels, then setting said white point and said black point to default values.

5. The method of claim 1, wherein step (4) comprises the steps of:

generating an average brightest red value by averaging red values of pixels in said "brightest" list;

generating an average brightest green value by averaging green values of pixels in said "brightest" list;

generating an average brightest blue value by averaging blue values of pixels in said "brightest" list; and setting said average bright color equal to a combination of said average brightest red value, said average brightest green value, and said average brightest blue value.

6. The method of claim 5, wherein said step (4) generates an average brightest red value $Red_{b,ave}$, an average brightest green value $Green_{b,ave}$, and an average brightest blue value $Blue_{b,ave}$, and further comprising:

a color content determining step for determining whether said average bright color has a color content indicative of white; said color content determining step includes determining a ColorContent value according to the following equation:

$$ColorContent=[\max(Red_{b,ave}, Green_{b,ave}, Blue_{b,ave}) - \min(Red_{b,ave}, Green_{b,ave}, Blue_{b,ave})]$$

wherein max and min represent functions for determining maximum and minimum values respectively.

7. The method of claim 1, further comprising the steps of:

determining whether said average bright color has a color content indicative of white; and if a color content of said average bright color is indicative of a color other than white, then setting said white point to a default value.

8. The method of claim 7, wherein said color content determining step compares said averages of red, green, and blue values of pixels in said "brightest" list to determine whether said average bright color has a color content indicative of white.

9. A document processing system in which image color is automatically adjusted, comprising:

an image capture device to generate a digital representation of a printed document, said digital representation comprising a plurality of pixels, each pixel having red, green, and blue values;

a color adjustment module, comprising means for calculating a brightness value consisting of a function of said red, green, and blue values for each of said pixels, means for generating a "brightest" list comprising a plurality of said pixels having the largest brightness values, average bright color calculating means for calculating averages Of red, green, and blue values of pixels in said "brightest" list to determine an average bright color of pixels in said "brightest" list, and scaling function generating means for generating red, green, and blue scaling functions each having a white point set equal to said average bright color;

an image scaling module to scale said digital representation in accordance with said red, green, and blue scaling functions to produce a modified image.

10. The document processing system of claim 9 in which each of said red, green, and blue scaling functions have a black point, wherein said color adjustment module further comprises:

means for generating a "darkest" list comprising a plurality of said pixels having the smallest brightness values; and means for calculating an average dark color of pixels in said "darkest" list;

wherein said scaling function generating means sets said black point to said average dark color.

11. The document processing system of claim 10, wherein said "brightest" list and said "darkest" list each comprise fifty of said pixels.

12. The document processing system of claim 10, wherein said color adjustment module further comprises:

means for determining whether said digital representation contains a sufficient number of pixels to accurately perform color adjustment; and means for setting said white point and said black point to default values if said digital representation does not contain a sufficient number of pixels.

13. The document processing system of claim 9, wherein said average bright color calculating means comprises:

means for generating an average brightest red value by averaging red values of pixels in said "brightest" list;

means for generating an average brightest green value by averaging green values of pixels in said "brightest" list;

means for generating an average brightest blue value by averaging blue values of pixels in said "brightest" list; and means for setting said average bright color equal to a combination of said average brightest red value, said average brightest green value, and said average brightest blue value.

14. The method of claim 13, wherein said average bright color calculating means generates an average brightest red value $Red_{b,ave}$, an average brightest green value $Green_{b,ave}$, and an average brightest blue value $Blue_{b,ave}$, and further comprising:

a color content determining means for determining whether said average bright color has a color content indicative of white; said color content determining step includes determining a ColorContent value according to the following equation:

$$ColorContent=[\max(Red_{b,ave}, Green_{b,ave}, Blue_{b,ave}) - \min(Red_{b,ave}, Green_{b,ave}, Blue_{ave})]$$

wherein max and min represent functions for determining maximum and minimum values respectively.

15. The document processing system of claim 9, further comprising:

means for determining whether said average bright color has a color content indicative of white; and means for setting said white point to a default value if a color content of said average bright color is indicative of a color other than white.

16. The document processing system of claim 15, wherein said color content determining means comprises means for comparing said averages of red, green, and blue values of pixels in said "brightest" list to determine whether said average bright color has a color content indicative of white.

17. A method of adjusting image color in a document processing system, comprising the steps of:
   (1) generating a digital representation of a document, said digital representation comprising a plurality of pixels;
   (2) calculating a brightness value for each of said pixels;
   (3) generating a "brightest" list comprising a plurality of said pixels having the largest brightness values;
   (4) calculating an average bright color of pixels in said "brightest" list;
   (5) determining whether said average bright color has a color content indicative of white;
   (6) setting a white point to equal said average bright color when said color content of said average bright color is indicative of white and to equal a default fault value when said color content of said average bright color is indicative of a color other than white;
   (7) generating red, green, and blue scaling functions based on said white point set in step (6); and
   (8) scaling said digital representation in accordance with said red, green, and blue scaling functions to produce a modified image.

18. The method of claim 17, wherein said step (5) compares averages of red, green, and blue values of pixels in said "brightest" list to determine whether said average bright color has a color content indicative of white.

19. The method of claim 17, wherein said step (4) generates an average brightest red value $Red_{b,ave}$, an average brightest green value $Green_{b,ave}$, and an average brightest blue value $Blue_{b,ave}$, and said step (5) includes determining a ColorContent value according to the following equation:

$$ColorContent = [\max(Red_{b,ave}, Green_{b,ave}, Blue_{b,ave}) - \min(Red_{b,ave}, Green_{b,ave}, Blue_{b,ave})]$$

wherein max and min represent functions for determining maximum and minimum values respectively.

* * * * *